United States Patent
Nethers

(10) Patent No.: US 10,076,107 B2
(45) Date of Patent: Sep. 18, 2018

(54) BELT ENGAGEABLE FISHING POLE HOLDER

(71) Applicant: James Lee Nethers, National City, CA (US)

(72) Inventor: James Lee Nethers, National City, CA (US)

( * ) Notice: Subject to any disclaimer, the term of this patent is extended or adjusted under 35 U.S.C. 154(b) by 0 days.

(21) Appl. No.: 15/297,049

(22) Filed: Oct. 18, 2016

(65) Prior Publication Data

US 2017/0105401 A1    Apr. 20, 2017

Related U.S. Application Data

(60) Provisional application No. 62/243,091, filed on Oct. 18, 2015, provisional application No. 62/243,092, filed on Oct. 18, 2015.

(51) Int. Cl.
*A01K 97/10* (2006.01)
*A45F 5/02* (2006.01)

(52) U.S. Cl.
CPC .............. *A01K 97/10* (2013.01); *A45F 5/021* (2013.01); *A45F 2200/0566* (2013.01)

(58) Field of Classification Search
CPC . A01K 97/10; A45F 2200/0566; A45F 5/021; Y10S 224/922; G10G 5/005
USPC ................................. 224/922, 672, 674, 666
See application file for complete search history.

(56) References Cited

U.S. PATENT DOCUMENTS

| | | | | |
|---|---|---|---|---|
| 2,576,624 A | * | 11/1951 | Miller | A01K 97/10 224/200 |
| 3,009,612 A | * | 11/1961 | Fischett | A01K 97/10 224/200 |
| 3,115,997 A | * | 12/1963 | Hengst | A01K 97/10 224/270 |
| 3,782,613 A | * | 1/1974 | Davis | A01K 97/10 224/673 |
| 3,885,721 A | * | 5/1975 | Vanus | A01K 97/10 224/200 |
| 4,817,323 A | * | 4/1989 | Braid | A01K 97/10 43/21.2 |
| 4,971,236 A | * | 11/1990 | Grummet | F41C 33/0209 224/193 |
| 5,195,948 A | * | 3/1993 | Hill | A61F 5/028 602/19 |
| 6,129,251 A | * | 10/2000 | Lajoie | A01K 97/10 224/197 |
| 6,588,639 B2 | * | 7/2003 | Beletsky | F41C 33/00 224/192 |
| 6,769,586 B1 | * | 8/2004 | Beletsky | A45F 5/02 224/662 |
| 8,770,455 B2 | * | 7/2014 | Clifton, Jr. | A45F 5/02 224/660 |
| 2005/0133561 A1 | * | 6/2005 | Kimball | A45F 5/02 224/674 |
| 2009/0145938 A1 | * | 6/2009 | Kahn | A45F 5/02 224/183 |

* cited by examiner

*Primary Examiner* — Adam Waggenspack
(74) *Attorney, Agent, or Firm* — Donn K. Harms

(57) ABSTRACT

A belt engageable fishing rod holder is provided having a body, a front wall, and a rear wall extending between two ends and a pair of opposing side edges. A belt running through the body is adapted for passage of a belt therethrough to hold the body against the body of a user where a rod holder projecting a front wall is configured to engage a handle end of a fishing rod.

15 Claims, 4 Drawing Sheets

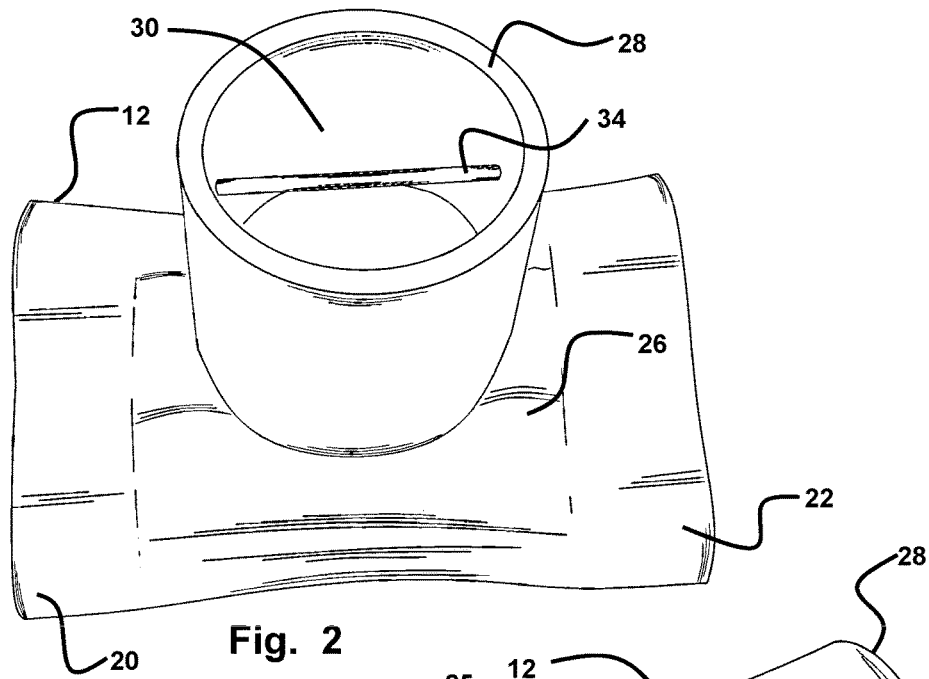
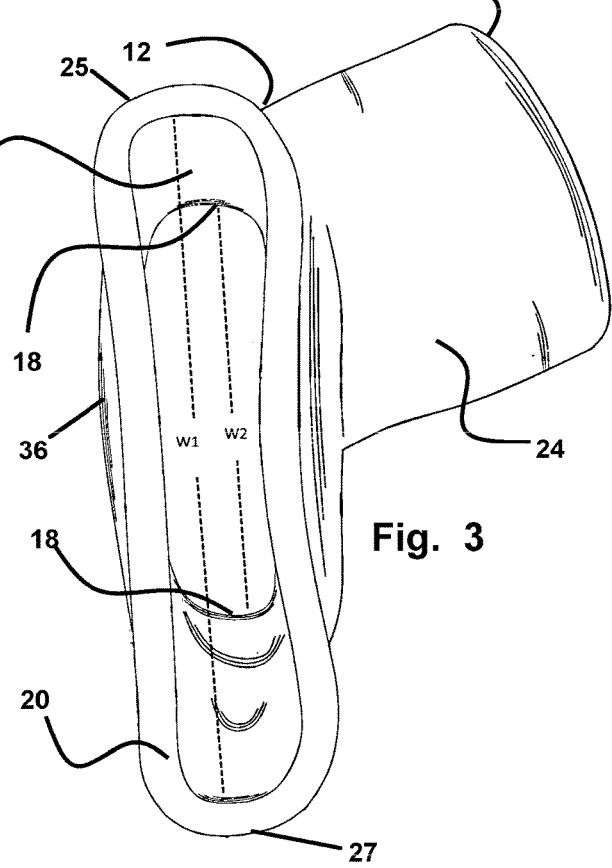

BELT ENGAGEABLE FISHING POLE HOLDER

This application claims priority to U.S. Provisional Patent Application Ser. Nos. 62/243,091 and 62/243,092 filed on Oct. 18, 2015, which is incorporated herein in its entirety by this reference thereto.

BACKGROUND OF THE INVENTION

1. Field of the Invention

The present invention relates generally to fishing poles or rods. More particularly, the invention relates to a fishing pole holder configured for a removable engagement with a belt of a user and adapted for operative engagement with the handle of a fishing pole or fishing rod.

2. Prior Art

As is well known, the sport of fishing employs a pole having a reel and fishing line operatively engaged. Conventionally, the reel is engaged at the butt end or handle end of the rod and is configured to both dispense and wind fishing line which extends from the distal end of the rod.

While an enjoyable sport, fishing can in many cases involve many hours of holding the fishing rod in the hands of the user, while waiting for, or in many cases hoping for, a fish to become hooked upon the dispensed line. Holding a rod in the hands for long periods of time, can put a strain on the hand of any angler, simply from the duration of time gripping the handle. In some cases, holding the rod for such long periods can turn an enjoyable afternoon of angling into a stressful exercise on the hand and grip of the user.

A number of pole or rod holder devices have been developed over the years to aid anglers in holding their pole during their pursuit of the sport of fishing. One popular version of such rod holding devices positions a rod holder on the person of the angler which is configured to be removably engageable with the handle end of the rod. Since fishing generally requires the rod to be located in front of the angler, such rod holders have been configured with belts or mounts to hold them on the front of the user or to engage the clothing of the user and provide a removable engagement to support the handle end of the rod while fishing.

A number of belt and waist-engaged fishing rod holders have been developed over the years. However, such rod mounts, while configured to slidably engage over the handle end of the rod easily, are not configured for the comfort of the user over long periods of time, and especially when sitting while fishing with the pole.

A primary cause of such discomfort is the force exerted by the torque of the elongated rod when engaged with the rod mount on the handle end. The weight of the rod and reel over time, and more significantly, the force of a fish pulling on the line which is slidably engaged at the distal end of the rod, can impart a significant rotating or turning of the rod mount which is engaged with the user's clothing, such as the belt.

The force of a fish, and just the force of the rod and reel over time, causes the rod mount to twist or rotate in its engagement to the clothing or belt of the user. Such rotation can occur in all three axis and tends to cause side edges and corners of the rod mount, to dig into and poke the skin of the user adjacent to the position of the rod mount. This can cause significant discomfort over time, and turn a peaceful day fishing into a painful exercise.

Additional issues are also known with belt-engaged rod mounts, where the belt of the user operatively connects with the rod mount. Such belt engaged mounts conventionally provide a pathway through the body of the mount through which the belt of the user is passed prior to engaging the distal end of the belt to a buckle or the like. Such belt engaged rod mounts are prone to sliding upon the belt to which they engage, especially when the user changes position or force from a fish or the rod and reel are communicated to the engaged rod mount. This can place the rod mount out of position and cause wear to the clothing in contact with the rod mount from translation on the belt.

As such, there exists an unmet need for a fishing rod mount that is engageable with the belt of an angler which has an exterior surface and overall configuration which is ergonomically shaped, not to pinch or poke or otherwise cause the user pain or irritation during use. Further, a need exists for such a belt engaged rod holder, which is configured to provide an easy to engage, yet secure positioning, on the belt during use which resists sliding.

It should be noted, the foregoing examples of related art and limitations related therewith are intended to be illustrative and not exclusive, and they do not imply any limitations on the device and system described and claimed herein. Various limitations of the related art in rod mounts are already known or will become apparent to those skilled in the art upon a reading and understanding of the specification below and the accompanying drawings.

An object of the present invention is the provision of a fishing rod mount which is removably engageable to the handle end of a fishing rod and adapted for engagement with the belt of the clothing of a user.

It is another object of the invention to provide such a rod mount, which has an exterior surface shaped to move while in communication with the body of the user, and eliminate pinching and poking to the body of the user.

It is yet another object of this invention, to provide such a belt engaged fishing rod mount, which includes a pathway for the belt through the body of the mount, which automatically anchors the rod mount in position on the belt and thereby resists sliding.

Yet a further object of this invention is the provision of such a fishing rod mount which is configured or configurable to provide a sliding or gimbaled engagement to the fishing rod.

Further objectives of the disclosed invention herein will be brought out in the following parts of the specification wherein the summary and detailed description of the invention are for the purpose of fully disclosing the invention without placing limitations thereon.

SUMMARY OF THE INVENTION

The present invention provides a solution to the noted shortcomings in the art with regard to body-worn fishing rod holders. In all preferred modes of the disclosed device, it features a body of the device which is adapted for engagement with the handle end of a fishing rod.

Additionally preferred in all modes of the device, is a belt passage or pathway which communicates through the body between two opposing sides, to engage the body of the device to the belt of the user. Further particularly preferred is a formation of the belt passage which is formed to allow easy passage of the belt through the body at opposing ends, but has a narrowing portion in a central area of the formed belt passage.

This narrowing portion at center area is preferred because it causes a crimping and slight fold on both sides of the belt engaged through the passage. It was found during experimentation that this narrowing portion forms a lock to hold the body on the belt and provides a means to prevent sliding of the body on the belt during use. Without this included narrowing portion, it was also found during experimentation, that should a large fish be hooked on by the rod, the force exerted through the rod from the distal end to the handle, may cause the body to slide the body on the belt. Such places the rod and reel at an odd angle to the user from the optimum positioning centered on their torso. Consequently, inclusion of this narrowing portion is particularly preferred.

Also preferred, in all modes of the body of the device herein, is a projecting portion extending in a curved rise or arched portion of the rear wall at a central portion of the body, and, curved top and bottom opposing edge surfaces of the body. The arch of the portion of the rear wall forming the centrally located projecting portion, has been found to settle slightly into the body of the user adjacent it, and help hold the body comfortably in place during use. While the body performed comfortably with a curved projecting surface extending between the two opposing sides, it was more stable and more comfortable with the centrally located arch forming the curved projecting portion, surrounded by a substantially planar portion of the rear exterior surface of the body adjacent the first and second ends.

Further, the curved top and bottom opposing edges of the body, allow the body to rotate upward and downward upon the curved surfaces, and smoothly against the body of the user. Such curved surfaces were found to be preferable to planar and non curved surfaces of the top and bottom of the body of the rod holder. The body with planar surfaces with narrow non curved edges were found to be prone to dig into the skin and body of the user during use. Such occurred when the user is sitting with the device on their belt or when in use during catching a fish. Thereafter, it was found that the inclusion of a body as shown with a formed arc or curve of both the curved top and bottom edges extending between the front wall and rear wall eliminated this problem and were found to be preferable in all modes of the device herein.

On the front wall of the body of all modes of the device, a projecting rod holding portion extends away from the front surface to a distal end. This projection rod holding portion has an axial passage communicating into it from the distal end which is adapted to hold the handle end of a fishing rod therein. A member engaged traverse to the axis of the passage and across the passage can be included and employed for a gimbal engageable rod. This traverse member can be permanently engaged, or in a convertible mode of the device, it can be removably engaged to allow use without it.

With respect to the above description, before explaining at least one preferred embodiment of the herein disclosed belt engageable fishing rod holder in detail, it is to be understood that the invention is not limited in its application to the details of construction and to the arrangement in the following description or illustrated in the drawings. The rod holder herein described is capable of other embodiments and of being practiced and carried out in various ways which will become obvious to those skilled in the art upon reading this disclosure. Also, it is to be understood that the phraseology and terminology employed herein are for the purpose of description and should not be regarded as limiting.

As such, those skilled in the art will appreciate that the conception upon which this disclosure is based, may readily be utilized as a basis for the designing of other belt engageable fishing rod holders and for carrying out the several purposes of the present disclosed system. It is important, therefore, that the claims herein be regarded as including such equivalent construction and methodology, insofar as they do not depart from the spirit and scope of the present invention.

BRIEF DESCRIPTION OF DRAWING FIGURES

The accompanying drawings, which are incorporated herein and form a part of the specification, illustrate some, but not the only or exclusive examples of embodiments and/or features of the invention. It is intended that the embodiments and figures disclosed herein are to be considered illustrative rather than limiting.

In the drawings:

FIG. 2 is a front perspective view of the device showing a projecting rod holding portion having an axial passage and having a member engaged across the passage employable as an engagement member for a gimbal engageable rod.

FIG. 3 is a side view of the body of the device showing the projection portion extending from the rear wall and the belt passage communicating through the body having a first width W1, which extends through a centrally located narrowing portion having a smaller width W2, as noted in FIG. 1.

DETAILED DESCRIPTION OF THE PREFERRED EMBODIMENTS OF THE INVENTION

Figure 1:
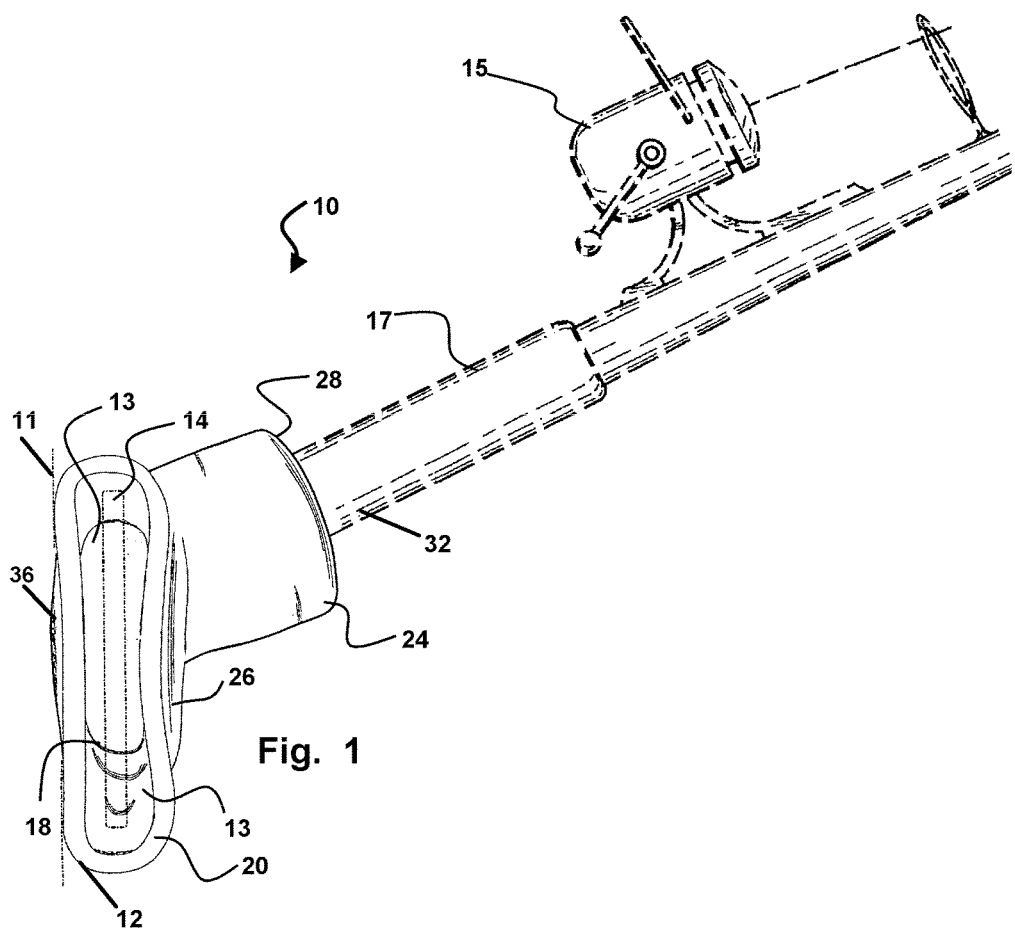
FIG. 1 is a side view of a body of the device showing it adapted for engagement with the handle end of a fishing rod, and showing a belt in broken line running through a belt pathway which narrows at a central point in a manner adapted to crimp a belt running therethrough. Also shown is a rear wall positioned projecting portion.

In this description, any directional prepositions if employed, such as up, upwardly, down, downwardly, front, back, first, second, top, upper, bottom, lower, left, right and other such terms referring to the device or depictions as such may be oriented, are describing it such as it appears in the drawings and are used for convenience only. Such terms of direction and location are not intended to be limiting or to imply that the device herein has to be used or positioned in any particular orientation.

Now referring to drawings in FIGS. 1-7, wherein similar components are identified by like reference numerals, there is seen in FIG. 1 a side view of a preferred mode of the device 10 which has a body 12, adapted for engagement with the handle end of a fishing rod 17. In all preferred modes of the device 10 herein, a belt passage 13 communicates through the body between opposing ends thereof.

This belt passage 13 is configured for engagement of a belt 14 therethrough which will enter and exit the belt passage 13 at opposing ends of the body 12, and allow the user to engage the body 12 to their belt 14 to an as-used positioning of the device 10, adjacent the front of the body of the user centered where the user may employ two hands to control the rod 17 and any reel 15 engaged therewith.

Figure 7:
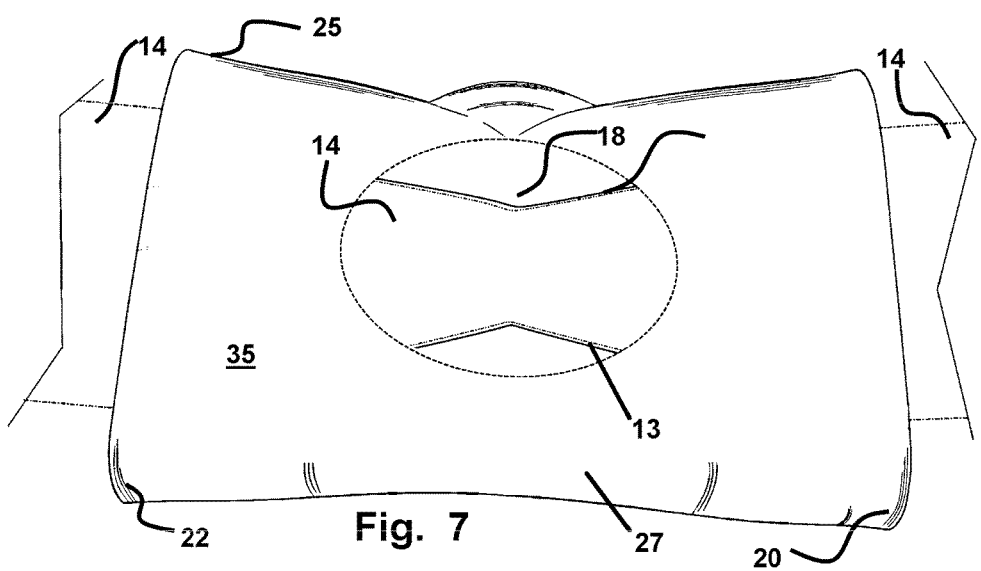
FIG. 7 is a depiction of a rear of the body of the device showing an oval cut away portion and the narrowing central portion of the belt passageway which is configured to crimp upon the two edges of a belt communicated through the body to hold the body in place on the belt.

As can be seen in FIG. 1, and FIG. 7, the belt passage 13 is formed with a narrowing portion or section 18 of the belt passage 13, positioned in a central area between the opposing ends 20 and 22, of the body 12. This narrowing section 18, is configured to be narrower than the openings to the belt passage 13 at the ends 20, and 22, and adapted to cause a folding or cinching of the belt 14 from the sidewall forming the narrowing section 18 of the belt passage 13.

This cinching of one or both opposing sides of the belt 14, forms a cinched engagement of the body 12 with the belt 14 of the user, when the device 10 is engaged with their belt 14 in the as-used position adjacent the body of the user and any clothing worn by the user sandwiched therebetween. Such a cinched engagement prevents a sliding of the body 12 on the belt 14 which was found to occur in modes of the device 10 with a smooth bore belt passage 13 lacking a narrowing section 18.

Shown in FIG. 2, is a front perspective view of the body 12 of the device 10, showing a projecting rod holder 24 extending away from an exterior surface of the front wall 26 of the body 12. The rod holder 24 extends to a distal end 28 and has an axial passage 30 depending into the rod holder 24 from the distal end 28. This axial passage 30 is configured to surround and operatively engage with the handle end 32 of the rod 17, during use with the device 10 in an as-used position engaged with the belt 14 on the user.

A member 34 may be positioned and engaged across the sidewall defining the axial passage 30, and employed where the handle end 32 of a rod 17 is in a gimbal engagement with the body 12. Such is popular to prevent lateral movement of the rod 17 once a fish is hooked and being played. In an alternative mode of the device 10 such as in FIG. 6, the member 34 may be left out or it may be removably engageable with the axial passage 30.

As shown in the figures, in a preferred mode of the device 10, curved opposing top and bottom edges 25 and 27, communicate about the exterior of the body 12 between the exterior surface of the front wall 26 and rear wall 35 of the body 10. As noted such were discovered during experimenting, to significantly reduce discomfort to the user wearing the device 10 on a belt 14 in an as-used position pressing against their torso, when sitting, or when working the rod and reel to wind in a fish.

A side view of the body 12 of the device is shown in FIG. 3. The rod holder 24 projects from the front wall 26, at an upward angle thereby positioning the axial passage 30 at an upward angle relative to the surface and front wall 26. This is preferred to maintain the rod 17 at an upward angle when the handle end is positioned within the axial passage 30. Also, shown are the belt passage 13, and the narrowing 18 thereof at a central portion.

Figure 4:
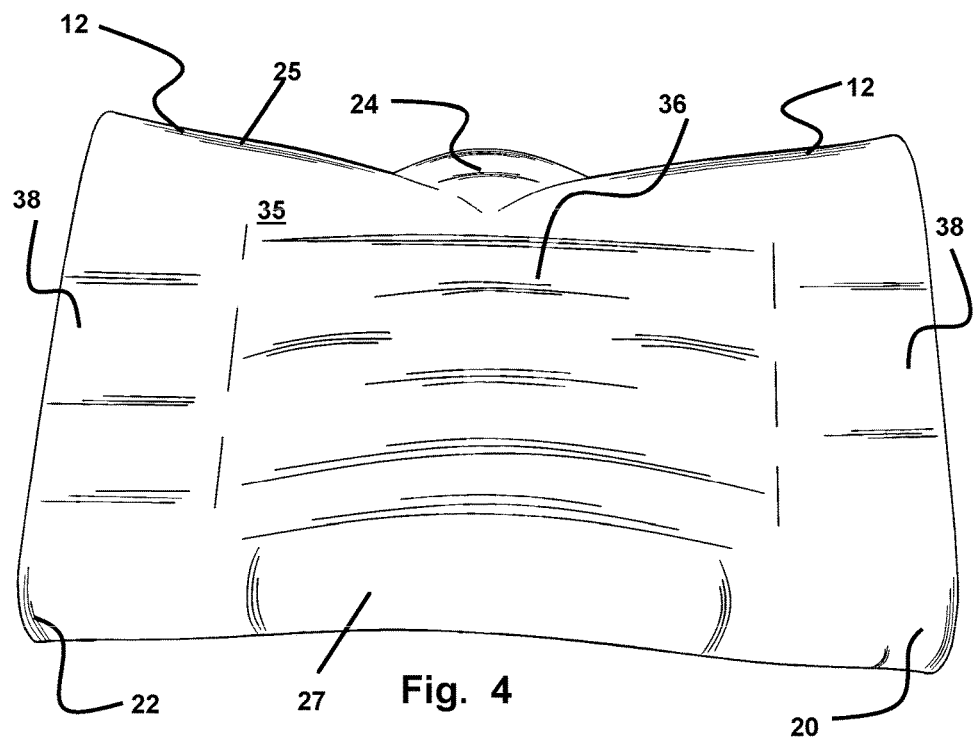
FIG. 4 depicts a rear perspective view of a favored mode of the body of the device, showing a curved ergonomic projecting portion extending from a central area of the rear wall of the body in-between the curved opposing side edges and planar portions adjacent the first and second ends.

As noted, FIG. 4, depicts a rear perspective view of a favored mode of the body 12 of the device 10. Shown is the rear wall 35 curved ergonomic projecting portion 36 centrally located between the first and second ends 20 and 22. As shown in FIG. 4, in a particularly preferred mode of the device 10 planar portions 38 are positioned on either side of the curved projecting portion 38 and adjacent the first and second ends. Such has been found to be comfortable to for the user during wearing of the device 10 on their belt 14, and also provide increased comfort and stability as the projecting portion is ergonomic and gently depresses the body of the user when pulled against it by the belt 14. This engagement has also been shown to enhance stability of the body 12 during use.

Figure 5:
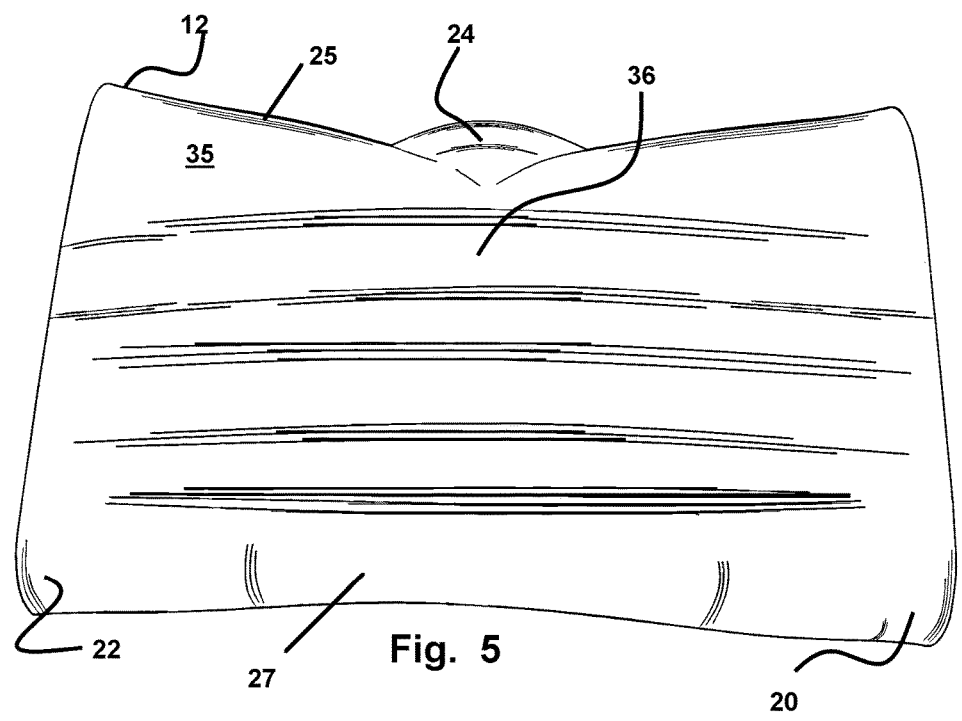
FIG. 5 depicts another mode of the device where the curved projecting portion extends between points immediately adjacent to the opposing first and second sides of the body.

An alternative mode of a curved projecting portion 36 is shown in FIG. 5, which in experimentation also worked well to provide a comfortable and ergonomic contact with the body of the user during use. In an unlikely discovery however, the mode of the device 10 in FIG. 4, with planar portions 38 on both sides was found to be more comfortable over long periods while concurrently providing an ergonomic contact with the body 11 of the user and stabilizing the body 12.

Figure 6:
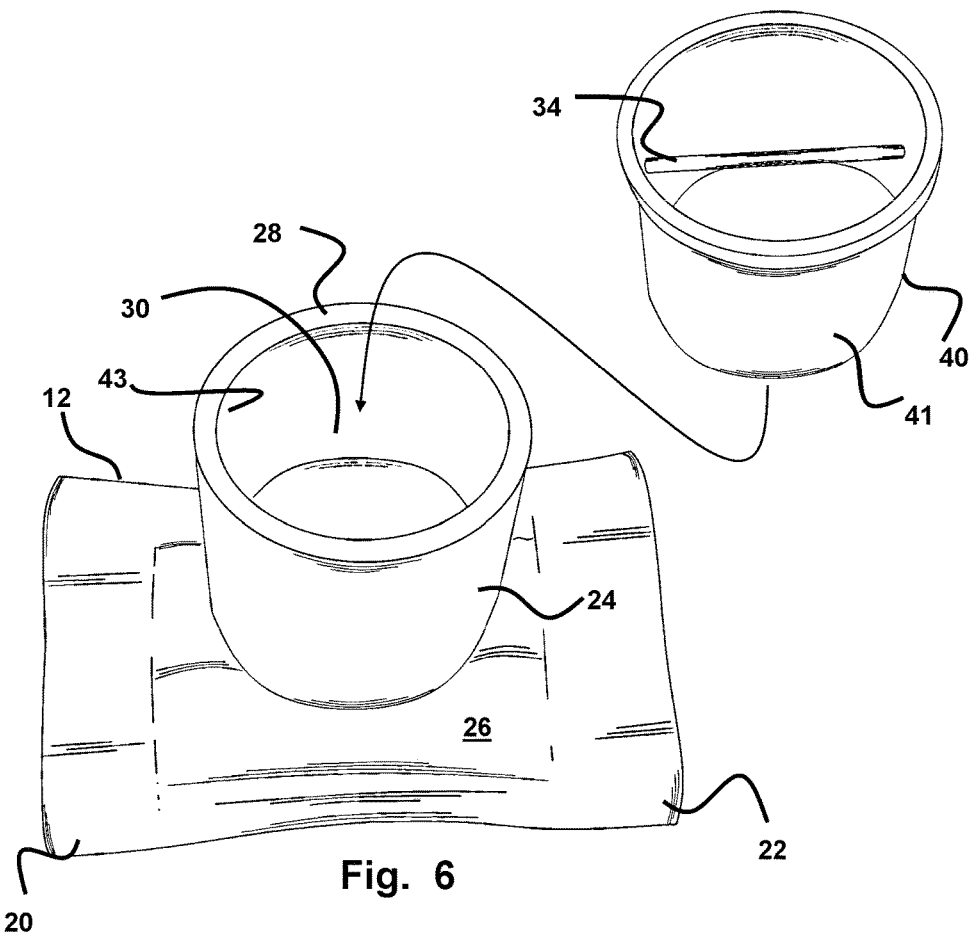
FIG. 6 depicts a front perspective mode of the body of the device, showing the body having a removably engageable traverse member for a gimbal engagement with the handle of the rod, which may be removed where the axial passage of the projecting portion is adapted to engage a rod in a non gimbal engagement.

In FIG. 6 is shown a front perspective view of the body 12 of the device 10 showing the axial passage 30 deepening into the rod holder 24, without a member 34 therein. The device 10 as shown may be employed in this manner, or a removably engageable member 34, situated in a removably engageable insert 40 adapted for removable engagement with the axial passage 30 may be employed. Such a removable engagement of the insert 40 may be by frictional engagement of the exterior wall 41 of the insert with an interior wall 43 defining the axial passage 30, or by threads on each, or other mating cooperative fasteners positioned on each of the axial passage 30 and the insert 40.

Finally, shown in FIG. 7, is a rear of the body 12 of the device 10 with a cut away sectional view, of the belt passage 13. As depicted the narrowing portion 18 which has a width or diameter W2 which is narrower than the width or diameter W1 of the belt passage 13, provides a frictional engagement crimping point in the belt passage 13. This is preferred in all modes of the device, whereby a belt 14 pulled through the belt passage 13 and extending therefrom at both ends 20 and 22, to an engagement surrounding the user, is crimped at the narrowing portion 18. This crimped engagement provides a position-fixing securement of the body 12 in position on the belt 14, which is not easily altered without significant force by the user. The narrower width W2 of the diameter of the passage 13 at the narrowing portion 18, will frictionally engage the sides of a belt 14 pulled through it, and in many cases will cause the opposing sides of the belt 14, to fold over one side surface of the belt 14 in a crimped engagement. Thus, where the device 10 is configured with the belt passage 13 such that it is adapted when employed with a belt 14 having a width wider than the width W2 at the narrowing point 18, for form such a crimped engagement in the preferred manner. With the device 10 in an as-used position on the belt 14 of a user such as in FIG. 1, this crimped engagement maintains the position of the body 12 on the belt 14 during use.

While all of the fundamental characteristics and features of the belt engageable fishing rod holder device 10 herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that upon reading this disclosure and becoming aware of the disclosed novel and useful device and system herein disclosed, that various substitutions, modifications, and variations may occur to and be made by those skilled in the art, without departing from the spirit or scope of the invention. Consequently, all such modifications and variations and substitutions, as would occur to those skilled in the art are considered included within the scope of the invention as defined by the following claims.

What is claimed is:

1. A fishing rod holder apparatus, comprising:
a body having a top edge and a bottom edge extending between a first end and a second end of said body;
said body having a front wall extending between said first end and said second end of said body;
said body having a rear wall extending between said first end and said second end of said body;
a pair of opposing side edges communicating in-between said front wall and said rear wall;
a belt passage communicating through said body, said belt passage positioned in-between said front wall and said rear wall, and running between a first opening in a first of said side edges at said first end, and a second opening in a second of said side edges at said second end of said body, said belt passage having a diameter running across said belt passage in a direction from said top edge of said body to said bottom edge of said body, said belt passage sized to receive a belt therethrough for holding said body of said rod holder against the body of a user in an as-used position;
a rod holder projecting from a first end engaged with a central area of said front wall in between said first end and second end of said body, to a distal end, said rod holder having an axial passage depending therein from said distal end;
said axial passage engageable with a gimbal on said handle end of a fishing rod said rear wall comprising a curved projecting portion extending away from the front wall and reaching a peak extension of the curve at the midpoint of said rear wall, and the portion of the rear wall between each side edge of the curved projecting portion and the first and second ends of the body being substantially planar.

2. The fishing rod holder apparatus of claim 1, additionally comprising:
curved opposing side edges, a first said curved opposing side edge formed by said top edge curving around and defining a top of said belt passage, between said front wall and said rear wall, a second said curved opposing side edge formed by said bottom edge curving around and defining a bottom of said belt passage, between said front wall and said rear wall, said curved opposing side edges defining ergonomic comfortable surfaces of said body of said fishing rod holder for contact against said body of said user.

3. The fishing rod holder apparatus of claim 2, additionally comprising:
curved opposing side edges, a first said curved opposing side edge formed by said top edge curving around and defining a top of said belt passage, between said front wall and said rear wall, a second said curved opposing side edge formed by said bottom edge curving around and defining a bottom of said belt passage, between said front wall and said rear wall, said curved opposing side edges defining ergonomic comfortable surfaces of said body of said fishing rod holder for contact against said body of said user.

4. The fishing rod holder apparatus of claim 3, additionally comprising:
a pair of opposing planar portions of said exterior surface of said rear wall positioned on opposite sides of said projecting portion, a first of said planar portions located between said projecting portion and said first end of said body, a second of said planar portions located between said projecting portion and said second end of said body.

5. The fishing rod holder apparatus of claim 1, additionally comprising:
said belt passage having a permanently narrowed portion thereof positioned in a central area of said belt passage in-between said first opening at said first end and said second opening at said second end of said body;
a width of said diameter of said belt passage within said permanently narrowed portion being shorter than a said width of said diameter of said belt passage at said first opening at first end of said body and at said second opening at said second end of said body; and
said permanently narrowed portion of said belt passage imparting a crimp to opposing edges of said belt having a belt width exceeding said said width of said diameter within said permanently narrowed portion when communicated though said belt passage, whereby said body is held in a fixed position upon said belt while in said as used position.

6. The fishing rod holder apparatus of claim 2, additionally comprising:
said belt passage having a permanently narrowed portion thereof positioned in a central area of said belt passage in-between said first opening at said first end and said second opening at said second end of said body;
a width of said diameter of said belt passage within said permanently narrowed portion being shorter than a said width of said diameter of said belt passage at said first opening at first end of said body and at said second opening at said second end of said body; and
said permanently narrowed portion of said belt passage imparting a crimp to opposing edges of said belt having a belt width exceeding said said width of said diameter within said permanently narrowed portion when communicated though said belt passage, whereby said body is held in a fixed position upon said belt while in said as used position.

7. The fishing rod holder apparatus of claim 2, additionally comprising:
said belt passage having a permanently narrowed portion thereof positioned in a central area of said belt passage in-between said first opening at said first end and said second opening at said second end of said body;
a width of said diameter of said belt passage within said permanently narrowed portion being shorter than a said width of said diameter of said belt passage at said first opening at first end of said body and at said second opening at said second end of said body; and
said permanently narrowed portion of said belt passage imparting a crimp to opposing edges of said belt having a belt width exceeding said said width of said diameter within said permanently narrowed portion when communicated though said belt passage, whereby said body is held in a fixed position upon said belt while in said as used position.

8. The fishing rod holder apparatus of claim 3, additionally comprising:
said belt passage having a permanently narrowed portion thereof positioned in a central area of said belt passage in-between said first opening at said first end and said second opening at said second end of said body;

a width of said diameter of said belt passage within said permanently narrowed portion being shorter than a said width of said diameter of said belt passage at said first opening at first end of said body and at said second opening at said second end of said body; and said permanently narrowed portion of said belt passage imparting a crimp to opposing edges of said belt having a belt width exceeding said said width of said diameter within said permanently narrowed portion when communicated though said belt passage, whereby said body is held in a fixed position upon said belt while in said as used position.

9. The fishing rod holder apparatus of claim 4, additionally comprising:

said belt passage having a permanently narrowed portion thereof positioned in a central area of said belt passage in-between said first opening at said first end and said second opening at said second end of said body;

a width of said diameter of said belt passage within said permanently narrowed portion being shorter than a said width of said diameter of said belt passage at said first opening at first end of said body and at said second opening at said second end of said body; and said permanently narrowed portion of said belt passage imparting a crimp to opposing edges of said belt having a belt width exceeding said said width of said diameter within said permanently narrowed portion when communicated though said belt passage, whereby said body is held in a fixed position upon said belt while in said as used position.

10. The fishing rod holder apparatus of claim 2, additionally comprising:

a member in an engagement across a central position in said axial passage, said member running perpendicular to an axis of said axial passage; and said member engageable with a gimbal on said handle end of said fishing rod.

11. The fishing rod holder apparatus of claim 10, additionally comprising:

said engagement of said member across said central position in said axial passage, being a removable engagement therein.

12. The fishing rod holder apparatus of claim 4, additionally comprising:

a member in an engagement across a central position in said axial passage, said member running perpendicular to an axis of said axial passage; and said member engageable with a gimbal on said handle end of said fishing rod.

13. The fishing rod holder apparatus of claim 5, additionally comprising:

a member in an engagement across a central position in said axial passage, said member running perpendicular to an axis of said axial passage; and said member engageable with a gimbal on said handle end of said fishing rod.

14. The fishing rod holder apparatus of claim 9, additionally comprising:

a member in an engagement across a central position in said axial passage, said member running perpendicular to an axis of said axial passage; and said member engageable with a gimbal on said handle end of said fishing rod.

15. The fishing rod holder apparatus of claim 14, additionally comprising:

said engagement of said member across said central position in said axial passage, being a removable engagement therein.

* * * * *